March 16, 1965    A. A. SMITH    3,173,510
GUIDANCE SYSTEM FOR AIR CUSHIONED VEHICLE
Filed May 1, 1961    3 Sheets-Sheet 1

INVENTOR.
ALFRED A. SMITH
BY
ATTORNEYS

INVENTOR.
ALFRED A. SMITH
BY Price & Heneveld
ATTORNEYS

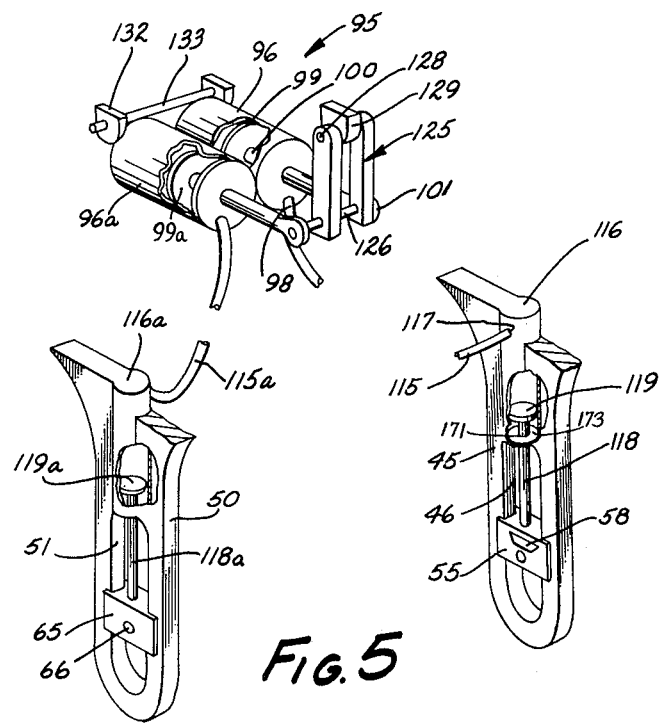
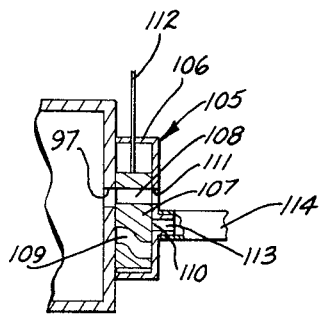
Fig. 5
Fig. 6
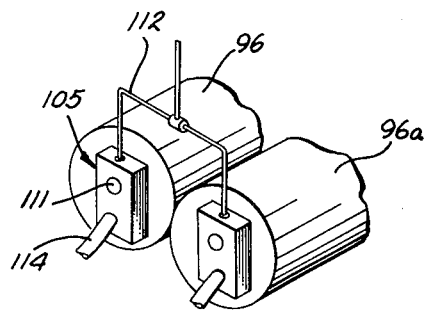
Fig. 7
INVENTOR.
ALFRED A. SMITH
BY Price & Heneveld
ATTORNEYS United States Patent Office 3,173,510
Patented Mar. 16, 1965

3,173,510
GUIDANCE SYSTEM FOR AIR CUSHIONED VEHICLE
Alfred A. Smith, 162 W. 19th St., Holland, Mich.
Filed May 1, 1961, Ser. No. 106,564
8 Claims. (Cl. 180—7)

This invention relates to a guidance system for air cushioning vehicles, and more particularly to driving and steering mechanism for air cushioned vehicles.

Air cushion vehicles normally have some means of forcing a stream of air against a reaction surface with sufficient pressure to suspend the vehicle above the surface. After the vehicle is suspended on the cushion of air, additional means for propelling and steering the vehicle are necessary. Although steering and propulsion may be accomplished in various ways, the present invention accomplishes these two operations by one or more combined driving and steering wheels which are telescopingly suspended from the body of the vehicle.

It is therefore an object of this invention to disclose a guidance system for an air cushioned vehicle which utilizes at least one wheel depending from the air cushion vehicle.

Yet another object of this invention is to provide a guidance system for an air cushion vehicle wherein steering and driving can be accomplished simultaneously by a single wheel.

Another object of this invention is to provide a guidance system for an air cushioned vehicle wherein at least one wheel is telescopically mounted with respect to the air cushion vehicle body and is designed to retract into said body when the vehicle rests upon the reaction surface and continues to engage the surface when the vehicle is suspended thereabove.

Still another object of this invention is to provide a gear arrangement which allows simultaneous driving and steering of the single wheel.

Another object of this invention is to provide a coordinated control system which provides means for locking the wheel so as to support the vehicle on the road under certain conditions.

Yet another object of this invention is to provide a coordinated control system which provides means for locking the wheel in a retracted position to facilitate propelling and steering by other means.

These and other objects and advantages of this invention will become more apparent upon reading the specification in conjunction with the accompanying drawings.

In the drawings:

FIG. 5 is a perspective view showing the wheel control system of the invention with the wheel supports exploded from the annular gear for convenience of illustration;

FIG. 6 is an enlarged, fragmentary cross-sectional view showing the valve means for the wheel control system; and FIG. 7 is an enlarged, fragmentary view of the coordinator cylinders showing a common operator for the coordinator valves.

Figure 1:
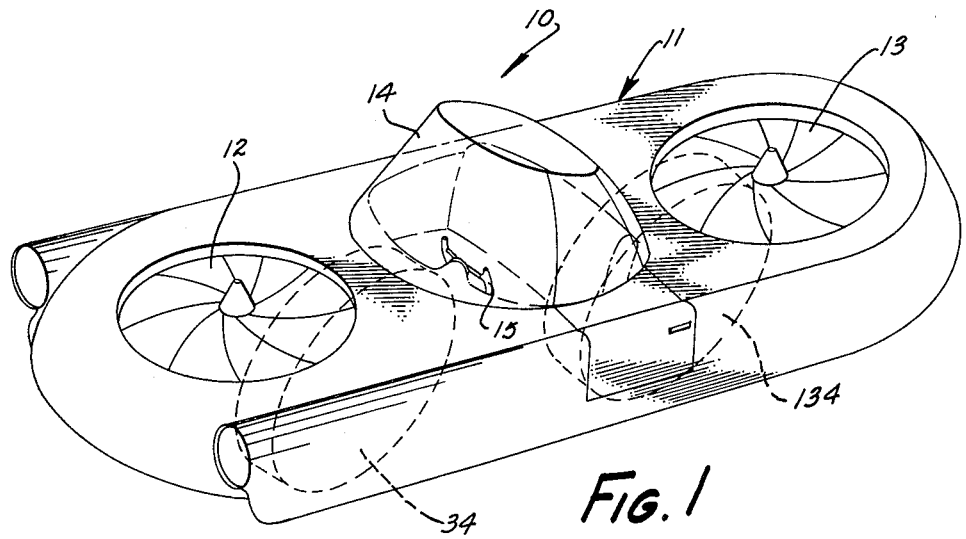
FIG. 1 is a perspective view of an air cushion vehicle.

Basically, this invention relates to a driving and steering mechanism for an air cushion vehicle. The vehicle has a body and some means of suspending the body above the ground on a cushion of air, this means in the instant case being blowers mounted fore and aft of the vehicle. The body of the vehicle is adapted to rest on the road and has one or more wheel compartments formed therein. A driving and steering unit has a steering gear which is journalled in the vehicle frame and has wheel supports secured thereto. The wheel supports depend downwardly from the frame into the wheel compartment. Wheel strut means of the telescoping variety are associated with the steering unit. One end of the strut is connected to slide blocks which are slidably mounted in and guided by the wheel supports. A wheel is fixed to an axle journalled in the slide blocks.

The other end of the wheel struts are in the form of pistons which are operable in strut cylinders fixed to the wheel supports. The strut cylinders have a hose connection with coordinators which are pivotally suspended from the bottom of the steering gear. Pistons having rods are operable in the coordinators. The rods are connected to a crank which is journalled in a pillow bracket. The coordinators are provided with valve means which allows a source of fluid pressure to be applied to one side of the coordinator pistons. A fluid column is provided between the other side of the coordinator cylinders and the strut cylinders; thereby, pressure applied to one side of the coordinators results in displacement of fluid into the strut cylinders and the extension of the struts and thereby of the wheel. The fluid pressure applied to the coordinators may be bled off to allow the wheel to retract under the weight of the vehicle. The valve is movable to a position to lock the wheel in the retracted position. The annular gear is connected to a pinion which forms part of the steering shaft. Thus, rotation of the steering wheel will result in rotation of the steering unit and turning of the wheel to steer the vehicle. A transfer gear is journalled on the annular gear and connects with a power source. A telescoping drive shaft has an upper pinion that connects with the transfer gear and a lower pinion which connects with an idler. The idler is carried by a slide block and it in turn meshes with a wheel gear which is fixed to the wheel. Thus, rotation of the transfer gear by the power means will rotate the telescoping drive shaft and in turn the wheel and propel or drive the air cushion vehicle.

The air cushion vehicle is designated generally as 10. The vehicle includes the body 11, the front blower 12, the rear blower 13, the cockpit 14, the driving and steering units 34 and 134. The unit 34 is further divided into the steering mechanism 35, wheel support members 45 and 50, slide blocks 55 and 65, wheel assembly 70, drive mechanism 75 and wheel control system 95. The driving and steering unit 134 has similar components.

Referring now more specifically to the details of the invention, FIG. 1 best shows the body 11 of the air cushioned vehicle now to be described.

The body 11 may be an elongated generally oblong shaped member. It has a front blower 12 and rear blower 13. The blowers 12 and 13 are of the radial type and rotated by conventional power means (not shown).

A body 11 has a cockpit 14 in which is mounted a steering wheel 15. The steering and driving unit 34 is located forward of and below the cockpit 14 as best shown in FIG. 1. The driving and steering unit 134 is located to the rear and below the cockpit.

The body 11 is built around a lower frame member 16 and an upper frame member 24. A wheel compartment is formed by the openings 17 and 25 in the upper and lower frame members, and an opening 23 formed in the ground support member 22 which is secured to the lower frame member 16. The ground support member is adapted to abut the road when the vehicle is inoperative.

The lower frame member 16 has a recess formed in the opening 17 to provide a gear track 18. The gear track 18 has a bearing race and bearing 19 formed therein. A gear pocket 21 is also formed in the lower frame member 16 and communicates with the gear track 18 and the top surface of the lower frame member.

The upper frame member is provided with a bearing race and bearings 29 which are aligned with the bearings 20 located in the lower frame member 16. A steering shaft aperture and bearing 27 is aligned and communicates with the gear pocket 21 in the lower frame member. The purpose for the bearings 20 and 29, and the gear pocket 21 will be explained more fully hereinafter.

Figure 2:
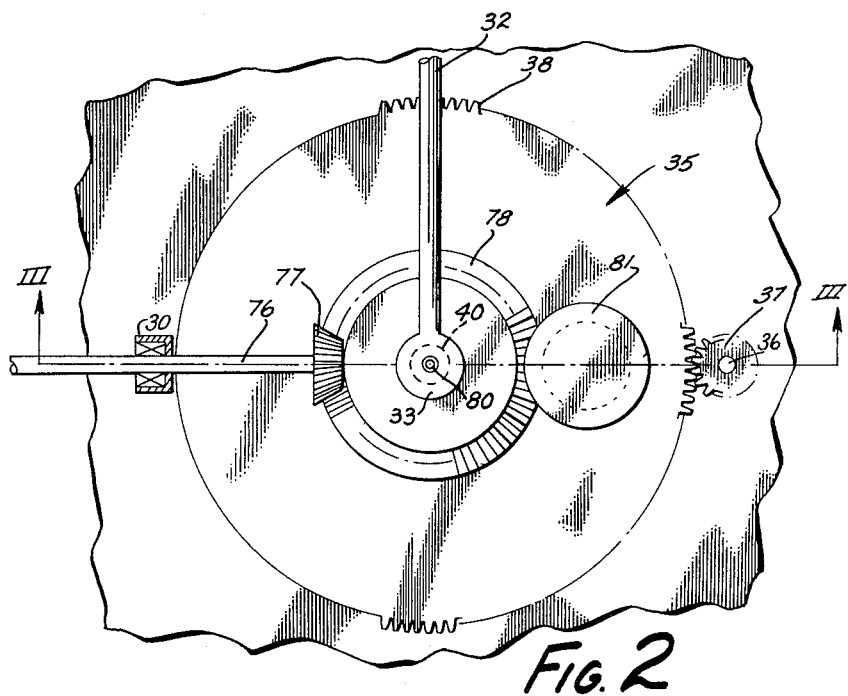
FIG. 2 is a plan view of the steering and propelling mechanism of the vehicle.
Figure 3:
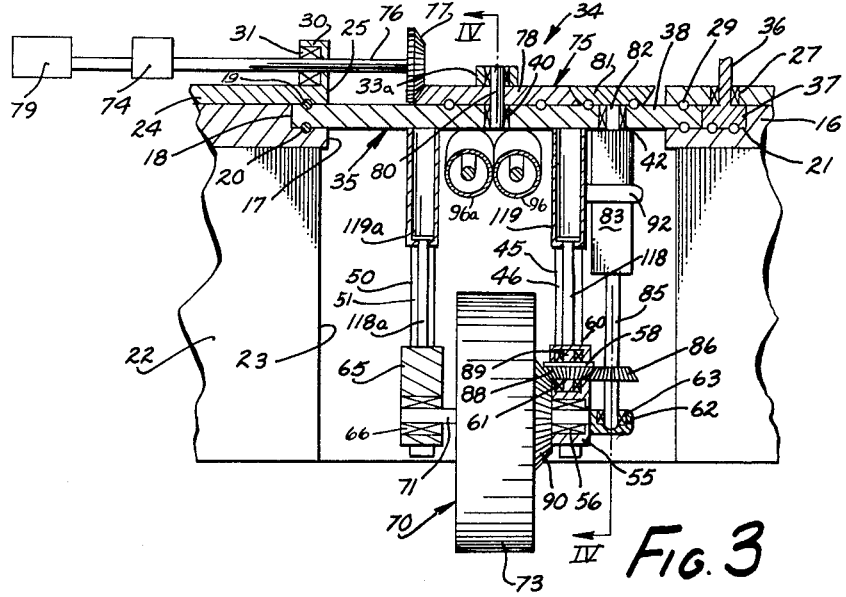
FIG. 3 is a cross-sectional view taken along the section lines III—II of FIG. 2.

The drive shaft housing 30 (FIG. 3) is mounted on top of the upper frame member 24. The drive shaft housing 30 has a drive shaft aperture and bearings 31. A bearing arm 32 is fixed to the upper frame 24, as shown in FIG. 2 and FIG. 3, and has a split bearing 33 which operates as a journal for a component of the drive mechanism 75 to be explained more fully hereinafter.

The driving and steering unit 34 includes the steering mechanism generally 35.

The steering mechanism 35 includes the steering shaft 36 which is connected between the steering wheel 15 and steering wheel shaft pinion 37 located in gear pocket 21. Alternatively, the shaft 36 may be connected to the selector box 140 for purposes which will be explained more fully hereinafter. The steering shaft pinion 37 meshes with the teeth formed on the outer periphery of annular gear 38. Annular gear 38 is of a diameter such that it is slightly smaller than the diameter of gear track 18. The top and bottom surfaces of the annular gear 38 are provided with bearing races which are aligned with the bearings 29 and 29. The annular gear 38 is thus rotatably journalled between the lower and upper frame members 16 and 24 respectively.

Figure 4:
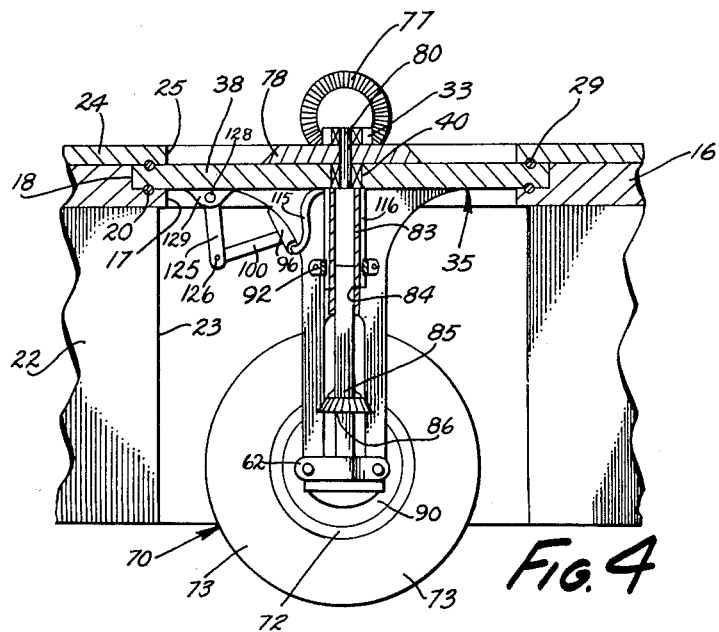
FIG. 4 is a cross-sectional view taken along the section lines IV—IV of FIG. 3.

The annular gear 38 is provided with a central aperture and bearings 40 for purposes which will be explained more fully hereinafter. This arrangement is best shown in FIGS. 3 and 4.

The annular gear 38 is also provided with an offset aperture and bearings 42 (FIG. 3). The purpose of aperture and bearings 42 will also be explained more fully subsequently.

Right and left, U-shaped wheel support members 45 and 50 are fixed to the bottom surface of annular gear 38. The right wheel support member 45 is located between the central aperture and bearings 40 and offset aperture bearings 42 as best shown in FIG. 3. The left wheel support member 50 is positioned in a plane parallel to the right support member 45, but is spaced therefrom and located an equal distance diametrically opposite the central aperture and bearings 40. Guide slots 46 and 51 (FIG. 3) are formed between the lower portions of the respective wheel support members 45 and 50.

The right slide block 55 is slidably mounted in the guide slot 46. The slide block 55 has a transverse axle opening and bearings 56 (FIG. 3). A transverse idler gear slot 58 is also formed in the slide block 55 and located above the axle opening 56. An idler gear stub shaft opening is located perpendicularly with respect to the idler gear slot and is provided with upper bearings 60 and lower bearings 61 which are positioned above and below the idler gear slot.

The slide block 55 has a shelf 62 which is formed integral therewith and projects outwardly therefrom. The shelf 62 has a telescoping drive shaft aperture and bearings 63.

A left slide block 65 is slidably disposed in the guide slot 51. It has a transverse axle opening and bearings 66. The slide block 65 may also carry conventional brake shoe mechanism (not shown) located on the inside surface of the sliding block.

The wheel assembly 70 includes an axle 71 to which is fixed a rim 72. A tire 73 is mounted on the rim 72. The axle 71 is of sufficient length so that it is journalled in the axle bearings 56 and 66 located in the respective slide blocks 55 and 65.

The steering and driving unit 34 also includes the drive mechanism designated generally as 75.

The drive mechanism 75 includes a drive shaft 76 which is connected at one end to a conventional change speed transmission 74, that is in turn connected to a source of power 79 both of which are shown diagrammatically (FIG. 3). The other end of drive shaft 76 is provided with a bevel pinion 77 which meshes with a bevel transfer gear 78. The bevel transfer gear 78 is fixed to a transfer gearshaft 80. The transfer gearshaft 80 projects above and below the transfer gear 78 and is journalled at its lower end in aperture and bearings 40 and at the upper end in split bearing 33 carried by bearing arm 32. The transfer gearshaft 80 is a hollow member as illustrated in FIG. 2 and provides means for the passage of conduits, such as the fluid pressure supply hose for the coordinators.

The transfer gear 78 meshes with an upper telescoping drive shaft pinion 81. The upper telescoping drive shaft pinion 81 is fixed to the upper telescoping drive shaft portion 82. The portion 82 is journalled in bearings 42. The portion 82 has a casing 83 with an internal square opening 84. The square opening 84 receives the lower portion 85 of the telescoping shaft. This arrangement allows the lower portion 85 to telescope within the upper portion 82, and at the same time provides a means for transmitting rotary motion from the upper portion to the lower portion. The lower extremity of the member 85 is of cylindrical configuration and is journalled in the bearings 63 provided in sliding block shelf 62. The lower telescoping drive shaft pinion 86 is fixed to the portion 65 and is located just above the shelf 62.

An idler gear 88 meshes with the lower telescoping driving shaft pinion 86 and is positioned in idler gear slot 58 (FIG. 5) formed in the slide block 55. The idler gear 88 is fixed to idler gear shaft 89. The idler gear shaft 89 is journalled in the upper and lower bearings 60 and 61 positioned in the slide block 65.

The idler gear 88 meshes with a wheel gear 90 which is fixed to the wheel rim 71. The idler gear 88 and wheel gear 90 are also both bevel gears.

A bracket 92 is fixed to the wheel support 45 and projects outwardly therefrom. The bracket 92 has a bearing in which the upper portion 82 of the telescoping power shaft is journalled. The bracket 92 in conjunction with the shelf 62 maintains the telescoping drive shaft in the proper vertical position.

The vertical wheel positioning system 95 is best illustrated in FIG. 5.

The system includes right and left coordinator cylinders 96 and 96a. Since both of these members are identical only the cylinder 96 will be explained in detail. The cylinder has a fluid pressure inlet 97 (FIG. 6) at one end and a hydraulic outlet 98 at the other end. A coordinator piston 99 is operable in the cylinder and has a piston rod 100 connected thereto. The piston rod 100 projects through an appropriate aperture formed in the end of the cylinder. A piston rod connector 101 is connected to the exterior end of the piston rod 100.

A coordinator valve 105 (FIGS. 6 and 7) is fixed to the end of the coordinator cylinder 96 adjacent the inlet 97. The valve 105 includes a valve housing 106 which is of generally rectangular design. The housing 106 contains a valve block 107 having an exhaust passage 108 and a feed passage 109. The valve block has a closure land 110 which is located between the passages 108 and 109. The housing 106 is provided with an exhaust port 111 which under certain circumstances also operates as a breather as explained more fully hereinafter with respect to the operation of the apparatus. The housing 106 is also provided with an inlet port 113. A valve operator 112 is connected to the block and is operable to slide the valve block to register the passages formed therein with the housing inlet and exhaust ports. The valve operator 112 may be mechanically interconnected with a similar operator on the valve system of the coordinator cylinder 96a so that both members are operated simultaneously, as best shown in FIG. 7. A fluid pressure supply hose 114 is connected to the inlet port of the valve housing of the respective coordinator cylinders 96 and 96a. A hydraulic hose 115 is connected to the outlet 98 of coordinator cylinder 96 and to the inlet 117 of strut cylinder 116. The strut cylinder 116 is fixed in position between the wheel support member 45. This is best illustrated in FIGS. 4 and 5. The strut cylinder 116 has a closed top end and an aperture 171 formed in the bottom end 173. A strut piston 119 is operable in the cylinder. The strut rod 118 passes through the aperture in the bottom end of the strut cylinder and connects with the piston. The other end of the strut rod is fixed to the slide block 55. A strut cylinder 116a is fixed between the split wheel support member 50 in a similar manner. The strut cylinder 116a is interconnected with the coordinator cylinder 96a by hose 115a. The strut cylinder 116a has a piston 119a and a strut rod 118a which connects with the piston and slide block 65. Hydraulic fluid works between the tops of the strut pistons 119 and 119a and the bottom (adjacent rod 100) of the coordinator pistons 99 and 99a to extend the strut rods and thereby the wheel assembly 70.

The coordinator cylinders 96 and 96a are connected together and operate as a unit. The pivot rod 133 is fixed to the valve end of the coordinator cylinders by conventional means such as welding. The pivot rod 133 is located transversely with respect to the longitudinal extent of the coordinator cylinders. Coordinator brackets 132 are fixed to the bottom surface of annular gear 38 and receive the ends of the pivot rod 133. Thus, the coordinator cylinders 96 and 96a are pivotally mounted at one end on the annular gear 38.

A crank shaft journal 129 is also fixed to the annular gear 38. The journal is aligned with the ends of the coordinators from which the coordinator piston rods project. The journal 129 receives a shaft 128 of a crank 125. The crank 125 has a rod 126 which connects to the coordinator piston rods. The crank 125 operates as a mechanical connection between the pistons of the coordinator cylinders 96 and 96a. With this arrangement the piston in each coordinator must move simultaneously and thereby displace an equal amount of hydraulic fluid.

*Operation*

Steering of the air cushioned vehicle is accomplished by turning the steering wheel 15 which rotates the steering wheel shaft 36 and pinion 37. Since the pinion 37 is meshed with the teeth on the annular gear 38, it will be rotated when the steering wheel is turned. The wheel supports 45 and 50 are fixed to the annular gear 38 and will turn when the gear turns. Since the wheel assembly 70 is journalled in the slide blocks which are carried by the wheel supports, the wheel will also be turned. Steering is accomplished in this manner assuming the air cushioned vehicle 10 has a single steering and driving unit such as 35.

The air cushioned vehicle may conceivably be provided with two steering and propelling units such as 34 and 134 (FIG. 1).

The vehicle is propelled by the power source 79 which is of conventional design. The output of the power source 79 is connected with a manual transmission or automatic transmission 74 of conventional design. The drive shaft 76 is connected with the transmission and with pinion 77. The pinion 77 meshes with transfer gear 78 which in turn meshes with the upper bevel pinion 81 of the telescoping drive shaft. The telescoping drive shaft transmits power to the lower pinion 86 fixed to the telescoping drive shaft. The pinion 86 meshes with the idler 88 which in turn meshes with the wheel gear 90. Power is thus transmitted to the wheel assembly 70 to rotate the wheel to propel the vehicle.

In normal operation the wheel assembly 70 is free floating. To provide for this the operator 112 is positioned such that the exhaust ports 108 in the valve block register with the exhaust ports 111 in the valve housing and the inlet ports in the coordinator cylinders 96 and 96a. With the valve in this position, the strut pistons 119 and 119a and coordinator pistons 99 and 99a are free to move in the cylinders. The column of hydraulic fluid between the tops of the strut pistons and the bottoms of the coordinator pistons (i.e. adjacent piston rod 100 of each piston) act to some extent as a shock absorbing means. When the valves are in this position, the wheel assembly or assemblies have contact with the road only as a result of the weight of the wheels. When the blowers support the vehicle above the ground, the wheels will fall under their own weight and contact the road.

Under certain circumstances, the blowers will not fully support the air cushioned vehicle above the support surface. When this is true, it is necessary to provide means for suspending the vehicle above the support surface. For example, if the air cushioned vehicle is passing over a bridge which has a grate-like structure, there is insufficient support surface to provide a reaction for the air discharged by the blowers. Thus, the vehicle would not be stably suspended above the support surface. The wheel control system 95 has been designed for the occasion when there is insufficient reaction surface. To operate the system the valve operator 112 is moved such that the inlet passages in the valve blocks (109 in valve block 107) registers with the valve housing inlets 111 and the inlets to the coordinator cylinders through hose 114. Fluid pressure from a supply (not shown) is admitted to the heads of the coordinator pistons. This will cause the pistons to move and displace the hydraulic fluid therein. The hydraulic fluid is forced through the hoses 115 and 115a into the struts cylinders 116 and 116a. The hydraulic fluid will act against the strut pistons 119 and 119a and cause them to move resulting in the extension of the strut rods 118 and 118a. Since the strut rods 118 and 118a are fixed to the slide blocks 55 and 65 they also will be extended and thereby extend the wheel assembly 70 which is journalled in the slide blocks. The wheel assembly or assemblies are thus maintained in the extended position. The crank 125 assures that an equal amount of hydraulic fluid is displaced from each coordinator thus providing an even pressure to each of the strut cylinders. When it is desired to again assume the free floating position, the valve is shifted such that the exhaust passages (108 in valve block 107) are shifted to register with the inlet ports in the coordinators through hose 114 and the exhaust ports in the valve housings (111 in valve housing 105) which allows the fluid pressure to bleed-off.

If, for any reason, it is necessary to lock the wheel assembly 70 in the wheel compartment the following procedure is followed. The blowers 12 and 13 are de-energized allowing the air cushioned vehicle to settle to the ground and rest upon the ground supports comprising the wheel assembly mechanisms 70. The weight of the vehicle will force the wheels into the wheel compartment. During the settling, the strut pistons 119 and 119a will force the hydraulic fluid out of the strut cylinders 116 and 116a and into the coordinator cylinders 96 and 96a. The valve operator 112 is then moved to register the closure lands of the valves (110 in valve block 107) with the inlet ports of the coordinators and the exhaust ports of the valve housings. A vacuum lock will thereby be created which will prevent the coordinator pistons from moving and thereby maintain the wheel in the retracted position. The valve may be moved to this position to lock the fluid pressure within the coordinators and maintain the wheel assembly extended.

It can be seen that the invention disclosed herein provides driving and steering mechanisms for an air cushioned vehicle. The mechanism is so constructed and arranged that the driving and steering can be accomplished simultaneously by a single wheel or pair of wheels. The mechanism consists of a minimum number of component parts which are economical to manufacture and can be assembled simply and quickly. The wheel is designed to be retractable into the body of the vehicle to provide for proper parking of the vehicle. When the vehicle is started, the wheel will assume the driving and steering position. The wheel mechanism may be locked in the extended position or retracted position by the wheel control system. A single unit may be used which provides for steering and driving. The vehicle may be provided with two driving and steering units which provide for coordinated steering and coordinated driving. It is also feasible to use a vehicle in which one unit drives and steers and the other unit merely trails neither driving or steering.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

I claim:

1. A vehicle of the type which utilizes a column of air maintained between the vehicle and the surface to suspend the vehicle free and clear of said surface comprising a body, means for suspending said body above said surface on said column of air, means for driving and steering said vehicle including at least one wheel unit connected to said body and retractable therein when said body is resting on the ground and engaging the ground when said body is susspended thereabove, first gear means for turning said wheel, second gear means for driving said wheel, said first and second gear means being operable simultaneously, power means for driving said second gear means, and said first gear means being connected to a steering wheel for steering said vehicle.

2. A vehicle of the type which utilizes a column of air maintained between the vehicle and the surface to suspend the vehicle free and clear of said surface comprising a body, means for suspending said body above said surface on said column of air, said body having an upper and lower frame member and ground support means secured thereto, a wheel compartment formed in said frame members and ground support means, a steering gear journalled between said upper and lower frame members, wheel supports connected to and depending from said steering gear, a wheel carried by slide blocks movably mounted in said wheel supports, a steering wheel shaft pinion gear meshed with said steering gear to turn said wheel for steering, a transfer gear carried by said steering gear, said transfer gear meshing with a drive shaft pinion and an upper telescoping drive shaft pinion, said telescoping drive shaft having a lower pinion meshing with an idler gear carried by a slide block, said idler gear meshing with a wheel gear fixed to said wheel, and power means for driving said drive shaft for propelling said vehicle.

3. A vehicle of the type which utilizes a column of air maintained between the vehicle and the surface to suspend the vehicle free and clear of said surface comprising a body, means for suspending said body above said surface on said column of air, said body having an upper and lower frame member and a ground support secured thereto, a wheel compartment formed in said frame members and ground support, first gear means journalled on said frame, spaced wheel supports fixed to said first gear means, guide slots formed in said wheel supports, a wheel axle journalled in slide blocks movable in said guide slots for reciprocal movement therein, a wheel fixed to said axle and positioned between said wheel support, telescoping wheel struts fixed to said first gear means and said slide blocks, said first gear means connected to the steering wheel for steering said vehicle, and second gear means connected to said axle and to power means for driving said wheel.

4. A vehicle of the type which utilizes a column of air maintained between the vehicle and the surface to suspend the vehicle free and clear of said surface comprising a body, means for suspending said body above said surface on said column of air, said body having an upper and lower frame member and a ground support secured thereto, a wheel compartment formed in said frame members and ground support, first gear means journalled on said frame, spaced wheel supports fixed to said first gear means, guide slots formed in said wheel supports, a wheel axle journalled in slide blocks housed in said wheel support for reciprocal movement in said guide slots, a wheel fixed to said axle and positioned between said wheel support, wheel struts fixed at one end to said slide blocks and having pistons formed at the other end, said pistons being operable in strut cylinders carried by said wheel supports, wheel control means associated with said wheel struts for extending said wheel, said first gear means being connected to the steering wheel for steering said vehicle, and second gear means connected to said axle and to power means for driving said wheel.

5. An air cushion vehicle as in claim 4 wherein said wheel control means includes coordinator means, said coordinator means having coordinator cylinders pivotally connected to said first gear means, coordinator pistons operable in said coordinator cylinders and having rods connected to a crank, said crank being journalled on said first gear means, means connecting said coordinator cylinders and said strut cylinders, fluid pressure means for actuating said coordinator pistons to move hydraulic fluid and extend said strut pistons and thereby said wheel, said crank causing said coordinator pistons to displace an equal amount of hydraulic fluid to each of said strut cylinders.

6. An air cushion vehicle as in claim 5 wherein valve means is associated with said fluid pressure means for admitting and bleeding fluid pressure to said coordinator means.

7. An air cushion vehicle as in claim 6 wherein said valve means includes structure for blocking said admitting and bleeding means simultaneously to lock said wheel in the retracted position.

8. A vehicle of the type which utilizes a column of air maintained between the vehicle and the surface to suspend the vehicle free and clear of said surface comprising a body, means for suspending said body above said surface on said column of air, said body having an upper and lower frame member and ground support means secured thereto, a wheel compartment formed in said frame members and ground support means, a steering gear journalled between said upper and lower frame members, wheel supports connected to and depending from said steering gear into said wheel compartment, said ground support means including a wheel carried by slide blocks movably mounted in said wheel supports, wheel struts fixed at one end to said slide blocks and having pistons formed at the other end, said pistons being operable in strut cylinders carried by said wheel supports, wheel control means including coordinator means, said coordinator means having coordinator cylinders pivotally connected to said first gear means, coordinator pistons operable in said coordinator cylinders and having rods connected to a crank, said crank being journalled on said first gear means, means connecting said coordinator cylinders and said strut cylinders, fluid pressure means for actuating said coordinator pistons to move hydraulic fluid and extend said strut pistons and thereby said wheel, said crank causing said coordinator pistons to displace an equal amount of hydraulic fluid to each of said strut cylinders, a steering wheel shaft pinion gear meshed with said steering gear to turn said wheel for steering, a transfer gear carried by said steering gear, said transfer gear meshing with a drive shaft pinion and an upper telescoping drive shaft pinion, said telescoping drive shaft having a lower pinion meshing with an idler gear carried by a slide block, said idler gear meshing with a wheel gear fixed to said wheel, and power means for driving said drive shaft for propelling said vehicle.

References Cited in the file of this patent

UNITED STATES PATENTS

| | | | |
|---|---|---|---|
| 936,395 | Worthington | Oct. 12, | 1909 |
| 2,872,991 | Collins | Feb. 10, | 1959 |
| 2,955,780 | Hulbert | Oct. 11, | 1960 |

FOREIGN PATENTS

| | | | |
|---|---|---|---|
| 9,011 of 1915 | Great Britain | Mar. 23, | 1916 |
| 1,238,499 | France | July 4, | 1960 |